(12) United States Patent
Fields

(10) Patent No.: US 7,665,658 B2
(45) Date of Patent: Feb. 23, 2010

(54) DYNAMIC AGGREGATION OF PAYMENT TRANSACTIONS

(75) Inventor: Helen Fields, Lexington, MA (US)

(73) Assignee: First Data Corporation, Greenwood Village, CO (US)

( * ) Notice: Subject to any disclaimer, the term of this patent is extended or adjusted under 35 U.S.C. 154(b) by 575 days.

(21) Appl. No.: 11/147,581

(22) Filed: Jun. 7, 2005

(65) Prior Publication Data

US 2006/0273152 A1    Dec. 7, 2006

(51) Int. Cl.
    *G06K 5/00* (2006.01)
(52) U.S. Cl. .................. 235/380; 235/375; 235/487; 705/44; 705/75
(58) Field of Classification Search ........... 235/380, 235/375, 487, 492, 379, 382.5; 705/1, 38, 705/44, 75
    See application file for complete search history.

(56) References Cited

U.S. PATENT DOCUMENTS

| | | | |
|---|---|---|---|
| 6,094,643 A * | 7/2000 | Anderson et al. ............ 705/44 |
| 7,225,977 B2 * | 6/2007 | Davis ........................ 235/380 |
| 7,263,506 B2 * | 8/2007 | Lee et al. ..................... 705/38 |
| 2002/0049760 A1 | 4/2002 | Scott et al. |
| 2002/0103998 A1 | 8/2002 | DeBruine |
| 2002/0138291 A1 | 9/2002 | Vaidyanathan et al. |
| 2002/0138362 A1 | 9/2002 | Kitze et al. |
| 2002/0138440 A1 | 9/2002 | Vaidyanathan et al. |
| 2002/0138552 A1 | 9/2002 | DeBruine et al. |
| 2002/0138576 A1 | 9/2002 | Schleicher et al. |
| 2002/0138744 A1 | 9/2002 | Schleicher et al. |
| 2002/0194108 A1 | 12/2002 | Kitze |
| 2002/0194119 A1 * | 12/2002 | Wright et al. ................ 705/38 |
| 2003/0061287 A1 | 3/2003 | Yu et al. |
| 2003/0126036 A1 * | 7/2003 | Mascavage et al. .......... 705/26 |
| 2004/0153389 A1 * | 8/2004 | Lortscher, Jr. ................ 705/36 |
| 2004/0199475 A1 | 10/2004 | Rivest et al. |
| 2004/0243832 A1 * | 12/2004 | Wilf et al. ................... 713/200 |

(Continued)

FOREIGN PATENT DOCUMENTS

DE    3930266 A1    3/1991

(Continued)

OTHER PUBLICATIONS

Abou-Gharbia, M., *Synthesis and Structure-Activity Relationship of Substituted Tetrahydro- and Hexahydro-1,2-benziosothiazol-3-one, 1,1-Dioxides and Thiadiazinoes: Potential Anxiolytic Agents*, J. Med. Chem., 1989, pp. 1024-1033, vol. 32.

(Continued)

*Primary Examiner*—Edwyn Labaze
(74) *Attorney, Agent, or Firm*—Townsend and Townsend and Crew, LLP

(57) ABSTRACT

A transaction aggregation method that includes the steps of receiving user data and a current transaction amount associated with a current transaction, and retrieving a reliability score for the user with the user data, and calculating an aggregation threshold based on the reliability score. The method also includes updating an aggregated transaction amount by adding the current transaction amount to a previously aggregated transaction amount from previous transactions, and comparing the updated aggregated amount with the aggregation threshold, where the current transaction is aggregated with the previous transactions when the updated aggregated amount is less than the aggregation threshold.

20 Claims, 4 Drawing Sheets

U.S. PATENT DOCUMENTS

| | | | |
|---|---|---|---|
| 2005/0044224 A1 | 2/2005 | Jun et al. | |
| 2005/0097320 A1* | 5/2005 | Golan et al. | 713/166 |
| 2006/0202012 A1* | 9/2006 | Grano et al. | 235/379 |
| 2007/0106517 A1* | 5/2007 | Cluff et al. | 704/273 |

FOREIGN PATENT DOCUMENTS

| | | |
|---|---|---|
| EP | 1 122 257 B1 | 10/2005 |
| WO | WO 95/13279 A1 | 3/1995 |
| WO | WO 95/15327 A1 | 6/1995 |
| WO | WO 96/07656 A1 | 3/1996 |
| WO | WO 97/11945 A1 | 4/1997 |
| WO | WO 98/06725 A1 | 2/1998 |
| WO | WO 00/38680 A1 | 7/2000 |
| WO | WO 00/39125 A1 | 7/2000 |
| WO | WO 00/55143 A1 | 9/2000 |
| WO | WO 00/66558 A1 | 11/2000 |
| WO | WO 00/66559 A1 | 11/2000 |
| WO | WO 01/44243 A2 | 6/2001 |
| WO | WO 01/90106 A2 | 11/2001 |
| WO | WO 02/07523 A2 | 1/2002 |
| WO | WO 02/060902 A1 | 8/2002 |
| WO | WO 03/097646 A | 11/2003 |
| WO | WO 2004/056773 A1 | 7/2004 |

OTHER PUBLICATIONS

Agawal, L., *Chemokine receptors: emerging opportunities for new anti-HIV therapies*, Expert Opin. Ther. Targets, 2001, pp. 303-326, vol. 5(3).

Baba, M., *A small-molecule, nonpeptide CCR5 antagonist with highly potent and selective anti-HIV-1 activity*, Proc. Nat. Acad. Sci. USA, 1999, pp. 5698-5703, vol. 96.

De Clerq, E., *Emerging anti-HIV Drugs*, Exp. Opin. Emerg. Drugs, 2005, pp. 241-274, vol. 10.

Dorr, P., *Abstr. of the 11th Conf. on Retroviruses and Opportunistic Infect.*, San Francisco, CA, USA, Feb. 10-14, 2003, Abstract, 12.

Dooseop, K.., *Discovery of Human CCR5 Antagonists Containing Hydantoins for the Treatment of HIV-1 Infection*, Bioorg. Med. Chem. Lett., 2001, pp. 3099-3102, vol. 11.

Dorr, P., *Maraviroc (UK-427, 857), a Potent, Orally Bioavailable, and Selective Small-Molecule Inhibitor of Chemokine Receptor CCR5 with Broad-Spectrum Anti-Human Immunodeficiency Virus Type 1 Activity*, Antimicrob. Agents Chemother., 2005, pp. 4721-4732, vol. 49(11).

Finke, P., *Antagonists of the Human CCR5 Receptor as Anti-HIV-1 Agents. Part 4: Synthesis and Structure-Activity Relationships for 1-[N-(Methyl)-N-(phenylsulfony)amino]-2-(phenyl)-4-(4-N-(alkyl)-N-(benzyloxycarbonyl)amino)piperidin-1-yl)butanes*, Bioorg. Med. Chem. Lett., 2001, pp. 2475-2479, vol. 11.

Finke, P., *Antagonists of the Human CCR5 Receptor as anti-HIV-1 agents, Part 2: Structure-Activity Relationships for Substituted 2-Aryl-1-[N-(methyl)-N-(phenylsulfonyl)amino]-4-(piperidin-1-yl)butanes*, Biorg. Med. Chem. Lett., 2001, pp. 265-270, vol. 11.

Finke, P. *Antagonists of the Human CCR5 Receptor as Anti-HIV-1 Agents. Part 3: a Proposed Pharmacophore Model for 1-[N-(Methyl)-N-(phenylsulfonyl)amino]-2-(phenyl)-4-[4-(substituted)piperidin-1-yl[butanes*, Bioorg. Med. Chem. Lett., 2001, pp. 2469-2473, vol. 11.

Hale, J., *1,3,4-Trisubstituted Pyrrolidine CCR5 Receptor Antagonists. Part 2: Lead Optimization Affording Selective, Orally Bioavailable Compounds with Potent Anti-HIV activity*, Bioorg. Med. Chem. Lett., 2001, pp. 2741-2745, vol. 11.

Kazmierski, W., *Recent Progress in Discovery of Small-Molecule CCR5 Chemokine Receptor Ligands as HIV-1 Inhibitors*, Biorg. Med. Chem., 2003, pp. 2663-2676, vol. 11.

Macartney, M., *43rd Intersci. Conf. Antimicrob. Agents Chemother.*, Chicago, IL, USA, Sep. 14-17, 2003, Abstract, H-875.

Maeda, K., *Novel Low Molecular Weight Spirodiketopiperazine Derivatives Potently Inhibit R5 HIV-1 Infection through Their Antagonistic Effects on CCRD*, J. Biol. Chem., 2001, pp. 35194-35200, vol. 276(37).

Maeda, K., *Spriodiketopiperazine-Based CCR5 Inhibitor Which Preserves CC-Chemokine/CCR5 Interactions and Exerts Potent Activity against R5 Human Immunodeficiency Virus Type 1 In Vitro*, J. Virol., 2004, pp. 8654-8662, vol. 78(16).

Maeda, K., *The current status of, and challenges in, the development of CCR5 inhibitors as therapeutics for HIV-1 infection*, Curr. Opin. Pharmacol., 2004, pp. 447-452, vol. 4.

Obst, U., *Synthesis of Novel Nonpeptidic Thrombin Inhibitors*, Helv. Chim. Acta., 2000, pp. 855-909, vol. 83.

Palani, A., *Discovery of 4-[(Z)-(4-Bromophenyl)-(ethoxylimino)methyl]-1'-[(2,4-dimethyl-3-pyridinyl)carbonyl]-4'-methyl-1,4'-bipiperidine N-Oxide (SCH 351125): An Orally Bioavailable Human CCR5 Antagonist for the Treatment of HIV Infection*, J. Med Chem., 2001, pp. 3339-3342, vol. 44(21).

Shiraishi, M. *Discovery of Novel, Potent, and Selective Small-Molecule CCR5 Antagonists as Anti-HIV-1 Agents: Synthesis and Biological Evaluation of Anilide Derivatives with a Quaternary Ammonium Moiety*, J. Med. Chem., 2000, pp. 2049-2063, vol. 43(10).

Strizki, J., *SCH-C (SCH 351125), an orally bioavailable, small molecule antagonist of the chemokine receptor CCR5, is a potent inhibitor of HIV-1 infection in vitro and in vivo*, Proc. Nat. Acad. Sci. USA, 2001, pp. 12718-12723, vol. 98.

Tagat, J., *Piperazine-Based CCR5 Antagonists as HIV-1 Inhibitors, II. Discovery of 1-[2,4-Dimethyl-3-pyridinyl)carbonyl]-4-methyl-4-[3(S)-methyl-4-[1(S)-[4-(trifluromethyl)phenyl]ethyl]-1-piperazinyl]-piperidine N1-Oxide (Sch350634), an Orally Bioavailable, Potent CCR5 Antagonist*, J. Med. Chem., 2001, pp. 3343-3346, vol. 44(21).

Watson, C., *The CCR5 Receptor-Based Mechanism of Action of 873140, a Potent Allosteric Noncompetitive HIV Entry Inhibitor*, Mol. Pharm., 2005, pp. 1268-1282, vol. 67(4).

Wood, A., *The Discovery of the CCR5 Receptor Antagonist, UK-427,857, A New Agent for the Treatment of HIV Infection and AIDS*, Prog. Med. Chem., 2005, pp. 239-271, vol. 43.

\* cited by examiner

DYNAMIC AGGREGATION OF PAYMENT TRANSACTIONS

FIELD OF THE INVENTION

The invention relates to methods and systems that aggregate smaller transactions into a larger transaction which is executed on a transaction network. The invention also relates to algorithms and controls for determining which transactions should be aggregated and which should be processed in an unaggregated state.

BACKGROUND OF THE INVENTION

Electronic payment instruments, and the marketplaces they serve, are becoming the preferred method of payment for small transactions. Historically, merchants required a minimum transaction amount before conducting a transaction with an electronic payment instrument such as a credit card. As customers came to demand that merchants conduct more small transactions with credit and debit cards, merchants kept lowering the transaction minimums until eventually they eliminated them altogether. Today, electronic payment is almost universally accepted even for purchases under a dollar.

New markets are also developing that have significantly increased the volume of small transactions. Most business to consumer transactions conducted on the Internet use some form of electronic payment. Some popular Internet commerce sites make individual songs, videos, articles, etc., available for download for a small fee (e.g., a dollar or less per downloaded song). Electronic payment is also becoming the preferred way to complete transactions on Internet auction sites, such as Ebay. A significant portion of these auctions are completed for small transaction amounts (e.g., the winning bid is less than five dollars, less than one dollar, etc.), generating increasing volumes of small electronic payment transactions from these sites as well.

Innovations in point of sale technology are even increasing the number of small payment transactions in stores and shops: Supermarkets are installing automatic checkout lanes that allow the shopper to scan and pay for goods electronically, without the assistance of a cashier. Most gas stations now have pay-at-the-pump technology that allows a customer to purchase gasoline electronically at the gas pump. Large retail chains are experimenting with radio-frequency identification (RFID) tags on goods and contactless payment instruments carried by the customer, which automatically process a transaction when the customer carries his or her purchase out of the store. These technologies not only increase the share of transactions conducted by electronic payment systems, they also make it faster and more convenient to buy single items and small amounts with electronic payments, increasing the numbers of small electronic payment transactions. Unfortunately however, as the number of small transactions being generated by Internet commerce and new point-of-sale technologies continues to grow, the transaction processing costs incurred by the merchant or auctioneer increase because processing costs represent a larger percentage of these transactions.

Most of the costs associated with electronic payment are fixed regardless of the transaction. These costs include the cost to build and maintain the payment network infrastructure, cost to administer the payment network, and cost to transmit, store, and report the transactions conducted on the network, among other costs. Because these fixed costs do not vary with the size of an electronic transaction, the fixed cost to execute 1000 transactions for a dollar each are 1000 times the cost of executing a single transaction for a thousand dollars. These added costs can jeopardize the economic viability of businesses whose sales primarily consist of large numbers of small transactions, like the increasingly popular music downloading businesses being established on the Internet. Thus, there is a growing need for new payment methods and systems that reduce the relative costs of small transactions that are completed with an electronic payment.

BRIEF SUMMARY OF THE INVENTION

Embodiments of the invention include a transaction aggregation method that includes the steps of receiving user data and a current transaction amount associated with a current transaction, and retrieving a reliability score for the user with the user data, and calculating an aggregation threshold based on the reliability score. The method also includes updating an aggregated transaction amount by adding the current transaction amount to a previously aggregated transaction amount from previous transactions, and comparing the updated aggregated amount with the aggregation threshold, where the current transaction is aggregated with the previous transactions when the updated aggregated amount is less than the aggregation threshold.

Embodiments of the invention may also include a method of selecting a transaction for aggregation with other transactions. The method may include the step of comparing a transaction amount associated with the transaction with a threshold amount, where the transaction is processed as an unaggregated transaction when the transaction amount exceeds the threshold amount, and where the transaction is aggregated with one or more other transactions into an aggregated transaction when the transaction amount is less than the threshold amount. The method may also include comparing an aggregated amount for the aggregated transaction with an aggregation threshold, where one or more additional transactions may be added to the aggregated transaction when the aggregated amount is less than the aggregation threshold, and where the aggregated transaction is processed when the aggregated amount exceeds the aggregation threshold. The aggregation threshold may be calculated based on a reliability score that is retrieved from data about a user who has initiated the transaction.

Embodiments of the invention may still further include a transaction aggregation system. The system may include an input to enter an identity of a user associated with a current transaction, and a memory to store user data associated with the identity, and current transaction amount for the current transaction, where the user data is used to determine a reliability score for the user. The system may still further include a processor to calculate an aggregation threshold based on the reliability score, and to update an aggregated transaction amount by adding the current transaction amount to a previously aggregated transaction amount from previous transactions, where the updated transaction amount is compared with the aggregation threshold, and the current transaction is aggregated with the previous transactions when the updated aggregated amount is less than the aggregation threshold.

Embodiments of the invention may still also include a transaction aggregation network. The network may include a first node where an identity of a user conducting a current transaction on the network is input, and a second node where user data associated with the identity of the user is stored, where the user data is used to retrieve a reliability score for the user. The network may also include a third node where an aggregation threshold based on the reliability score is calculated, and an updated aggregated transaction amount is generated by adding a current transaction amount to a previously aggregated transaction amount from previous transactions. The updated transaction amount may be compared with the aggregation threshold, and the current transaction may added to the previous transactions to form an aggregated transaction when the updated aggregated amount is less than the aggregation threshold.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Aggregating multiple small transactions into a larger transaction offers a simple solution for controlling the transaction processing costs incurred by making large numbers of small transactions. However, the larger aggregated transactions also expose a merchant or service provider to risks of higher losses should a customer default on payment. Moreover, the risk of default also increases when the smaller payments are being aggregated over a period of weeks, or even months, before the customer must actually tender payment. The present invention addresses these and other issues with methods, systems and networks for aggregating a plurality of smaller transactions into a larger transaction for execution on an electronic payment network. A decision to aggregate two or more transactions may be facilitated by rules (e.g., computer algorithms) and manual controls set by a seller (e.g., a merchant or service provider) about when aggregation of a customer's transactions would be an acceptable payment risk. Aggregating the smaller transactions into a larger transaction lowers the costs related to processing the transaction on an electronic payment network. Decreasing the risk of payment default on the larger, aggregated transaction prevents the savings realized by the lower processing costs from being eroded by higher transactions costs caused by more frequent and more costly defaults.

Exemplary Methods

Figure 1:
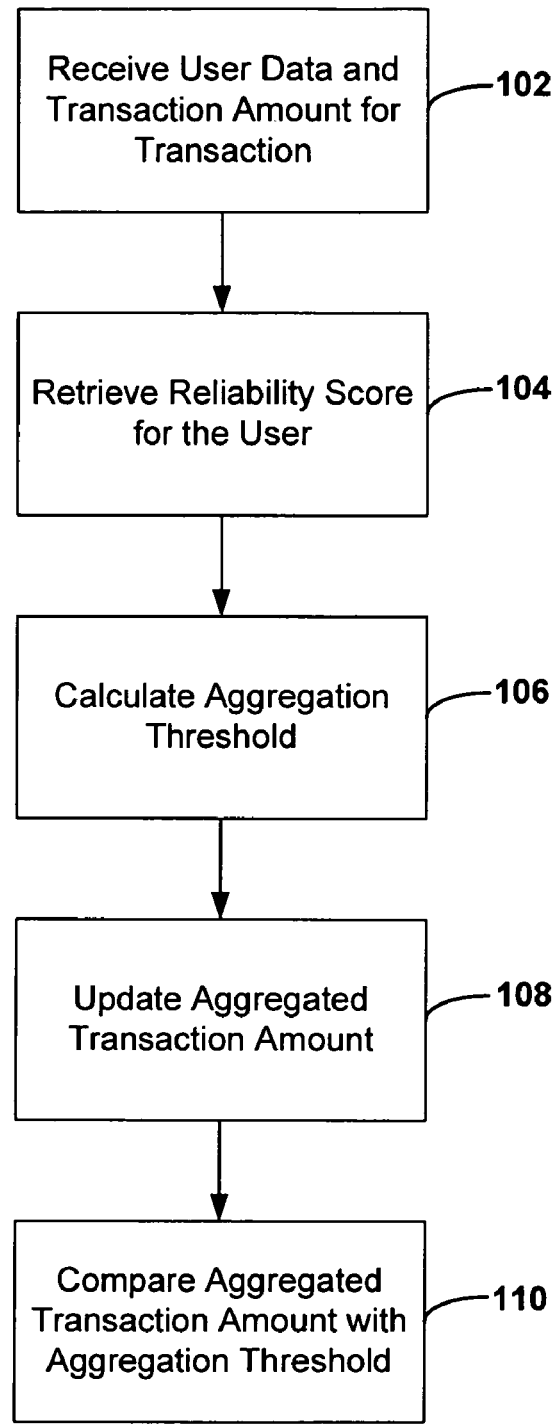
FIG. 1 shows a flowchart for a method of aggregating payments according to embodiments of the invention.

FIG. 1 shows a flowchart for a method 100 of aggregating payments according to embodiments of the invention. The method 100 may include receiving user data and a transaction amount 102 from a user (e.g., store patron, online customer, etc.) who would like to purchase a good or service from the seller (e.g., a merchant, vendor, auctioneer, automated transaction daemon, service provider, etc.). The user data that may be received by the user may include a user's name, postal address, email address, social security number, IP address, transaction account number, and/or other data that may be used to associate the identity of the user with a reliability score for the user.

The user data may be used to retrieve the reliability score 104 of the user. The reliability score is a quantitative representation of the likelihood that a user will tender payment for the good or service at some time point in the future. This score may be used to calculate an aggregation threshold 106 for the user that sets an upper limit on the value of the transactions that will be aggregated before the agglomerated transaction is executed over an electronic payment network.

A transaction amount for a current transaction may be provisionally aggregated with any prior transactions that have not been completed to generate an updated aggregated transaction amount 108. The updated aggregated transaction amount may then be compared to the aggregation threshold 110 to determine whether the current transaction should be aggregated with the prior aggregated transactions that are awaiting completion. If the updated aggregated transaction amount is greater than the aggregation threshold, then the current transaction will not be aggregated, and the current transaction may be processed immediately in an unaggregated state. If the updated aggregated transaction amount is equal to or less than the aggregation threshold, then the current transaction will be aggregated with the previously aggregated transactions.

Figure 2:
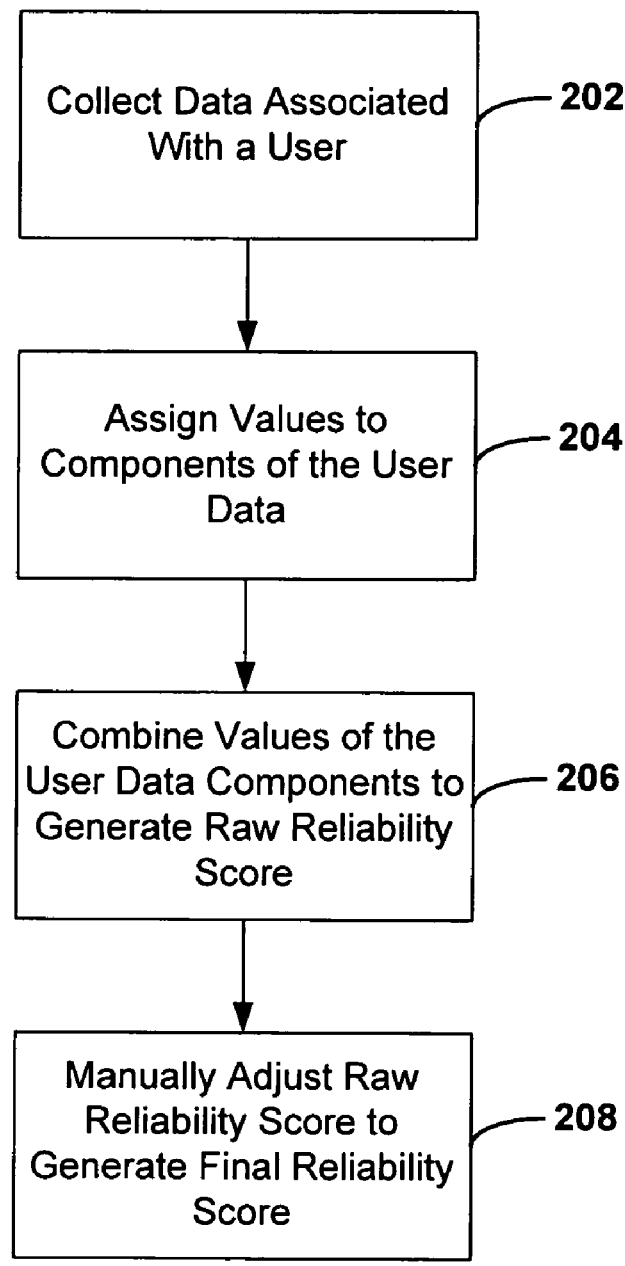
FIG. 2 shows a flowchart for a method of determining a reliability score according to embodiments of the invention.

The reliability score used to calculate the aggregation threshold may be determined through a variety of methods. FIG. 2 shows an embodiment of a method for calculating the reliability score 200 that includes collecting data associated with the user (e.g., customer, buyer, purchaser, etc.) 202. The user data collected may include data about the user's credit history, payment history, number of transactions, frequency of transactions, transaction size, duration as a user, number of website visits, buying habits (e.g., types of goods or services purchased, how many, times of purchases, purchase price, discount level, etc.), fraud history (e.g., information from fraud databases, industry databases, merchant databases, federal, state and local government databases, financial databases, legal databases such as Westlaw and Lexis, etc.), education level, income level, and/or employment history, among other kinds of data. The used data may also include user identification information such as, a user's name (including aliases), email address, home and/or work address, home, work and/or wireless phone number, financial account identifiers, social security number, and information about relates parties, such as spouses, parents, children, etc., among other types of identification information. Additional description of user identification information, and how it can be used to verify a user's identity, can be found in co-assigned U.S. patent application Ser. No. 11/031,469, filed Jan. 6, 2005, and entitled "Identity Verification Systems and Methods," the entire contents of which are hereby incorporated by reference for all purposes.

Values may be assigned to all (or a portion) of the user data 204. The values represent a quantitative representation of the relative importance of each piece of user data. The values may be assigned using a variety of techniques, including for example, a binary representation of the presence of a data element (e.g., assigning a "1" when an element is present or true, and a "0" when the element is absent or false) multiplied by a weigh factor (e.g., fraction from 0 to 1) that represents the relative importance of the element. Rules for determining the weight factor may include having the sum of all weight factors sum to a constant value (e.g., "1"). Thus, an increase in the value of one weigh factor requires an equivalent decrease in the value of one or more other weight factors to maintain a constant sum. In other examples, the rules for determining weight factors may include independently determining a value for each element on a fixed scale.

Embodiments are also contemplated where values are directly assigned to the data elements based on a linear scale (e.g., an integer scale from 0 to 100, or −10 to 10, etc.). Default values may be assigned to the state of each data element, and these default values may be manually adjusted by a merchant, creditor, etc. for an individual user or group of users (e.g., a group of users who make purchases at a particular store or website, users who have been purchasing for length of time or longer, users purchasing a particular category of good or service, etc.).

The assigned values for the components of the user data may then be combined to generate a raw reliability score 206. The combining of the values may be a simple summing of the component values, or something more complex such as summing the component values and dividing the sum by a normalization factor, or multiplying the sum by a proportionality constant and/or a conversion factor.

The raw reliability score may be manually adjusted to generate a final reliability score 208 used to calculate the aggregation threshold in step 106 above. The manual adjustment may be done by a merchant, creditor, customer service agent, etc., who can increase or decrease the raw score based on special circumstances, user relationship, macroeconomic changes, negotiations, special promotions, transaction load, etc. For example, in some embodiments, a loyalty factory may be calculated based on special circumstances, user relationship, etc. Additionally, the loyalty factor may be multiplied with a preliminary aggregation threshold in order to produce the agreggation threshold in step 106 above. In some embodiments, one or more of the components (either individually, or collected together as a subset of the overall reliability score) may be manually adjusted instead of the raw score itself. In these instances, a merchant, creditor, etc. may have noticed a stronger (or weaker) than predicted correlation between the one or more components and the risk of user non-payment, and may want to adjust the relative importance of that factor in determining the overall reliability score.

Figure 3:
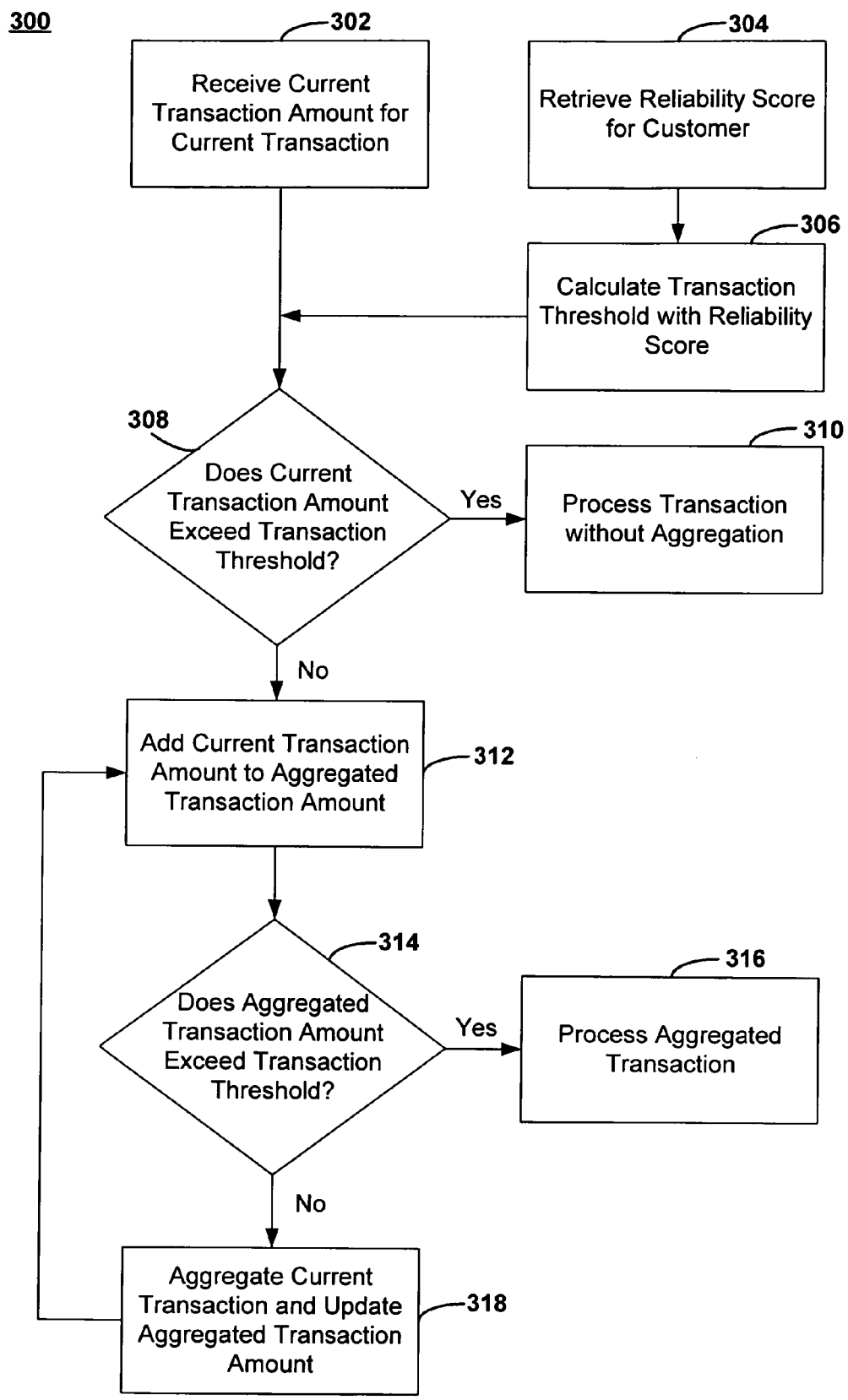
FIG. 3 shows a flowchart for a method of determining whether to aggregate a transaction with one or more prior transactions according to embodiments of the invention.

Referring now to FIG. 3, another embodiment for a method 300 of determining whether to aggregate a transaction with one or more prior transactions is shown. The method 300 includes receiving a transaction amount for the current transaction 302 and retrieving a reliability score of a user (e.g., customer, purchaser, buyer) involved in the transaction 304. The retrieval 304 may include searching a database storing reliability scores for a plurality of users using one or more pieces of user data (e.g., user name, user telephone number, user email address, etc.) uniquely associated with the stored reliability score. The retrieved reliability score may then be used to calculate a transaction threshold 306, representing an upper limit on the summed value of the transactions that can be aggregated together. The default transaction threshold may be manually increased or decreased by an operator (e.g., merchant, creditor, customer service representative, etc.).

As a preliminary step in determining with the current transaction can be aggregated with other transactions involving the user (or user account), the transaction amount for the current transaction is compared with the transaction threshold to see whether the current transaction amount equals or exceeds the transaction threshold 308. If the current transaction amount does equal or exceed the transaction threshold, then the transaction is processed without being aggregated with any other transactions 310. However, if the current transaction amount is less than the transaction threshold, then the current transaction is (or will be) aggregated with one or more other transactions 312.

The value of the aggregated transactions, which includes the current transaction, may be compared with the transaction threshold to determine whether the aggregated transaction amount equals or exceeds the transaction threshold 314. If the current transaction about equals or exceeds the transaction threshold, then the aggregated transaction will be processed immediately across a transaction network 316. However, if the aggregated transaction about is still less than the transaction threshold, then the aggregated transactions (including the current transaction) will be held and aggregated with additional transactions until the aggregated transaction amount equals or exceeds the transaction threshold 318.

Method 300 uses a threshold based on an upper limit for a transaction amount to determine whether to process a transaction without aggregation, and whether to process aggregated transactions immediately or hold them for aggregation with additional transactions. Additional criteria may be used in addition to (or in lieu of) an upper limit on the transaction amount to determine whether to aggregate a current transaction, and when to process a group of aggregated transactions. For example, a time threshold may be introduced that causes the aggregated transactions to be processed when the oldest transaction in the group exceeds a preset age limit (e.g., a week, two weeks, a month, etc.)

Embodiments of the invention also include dynamically recalculating the reliability score as user data is updated, and/or added. These recalculations may take place at periodic intervals (e.g., daily, weekly, monthly, etc.) and/or as a new or changed piece of user data becomes available. New comparisons of the presently held aggregated transactions with an updated reliability score may be done on a periodic basis, and/or automatically each time the reliability score is updated. When the updated transaction threshold calculated from the new reliability score equals or exceeds the aggregated transaction amount, the aggregated transactions may be processed immediately.

Exemplary Systems

Figure 4:
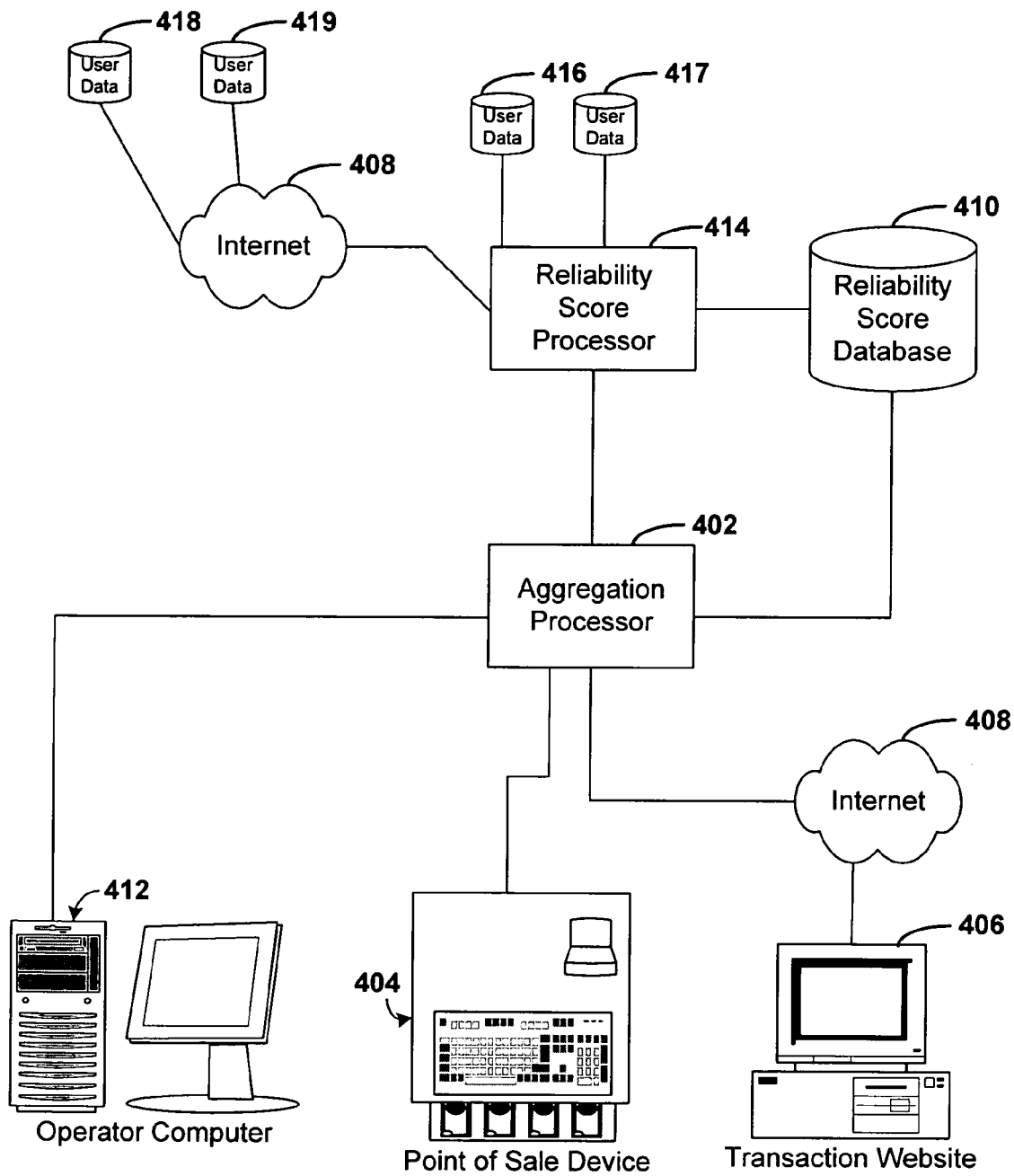
FIG. 4 shows a transaction aggregation system according to an embodiment of the invention.

FIG. 4 shows a transaction aggregation system 400, according to an embodiment of the invention. The system 400 includes an aggregation processor 402 that may determine whether to aggregate a current transaction with one or more other transactions. The aggregation processor may receive user data and transaction information from a plurality of transaction interfaces, including a point of sale input device 404 operated at a merchant's place of business, and an Internet website displayed by the user on a computer 406 in the user's home or office. The aggregation processor 402 may communicate with the transactions interfaces through a dedicated communication line, private network connection, and/or a secure socket layer (SSL) connection on the public Internet 408. Alternative and/or in addition to using an SSL connection, aggregated transaction data from the aggregation processor may be encrypted in some embodiments.

The aggregation processor 402 receives user data and information about a current transaction from a point of sale device 404 or user's computer 406, and queries a reliability score database 410 for the user's reliability score with user data that can identify a reliability score for the user. The user's reliability score sent to the aggregation processor 402 may then be used to determine whether the current transaction should be aggregated with previous transactions. This determination may include using the retrieved reliability score to derive a transaction size threshold, which the sets an upper limit for the size of transaction that can be aggregated for that user.

The aggregation processor 402 may also be in communication with an operator computer 412 controlled by a merchant, creditor, bank, service representative, etc. that may be used to establish and/or change the algorithms used to determine whether a current transaction will be aggregated, whether a group of aggregated transactions will be processed, etc. Embodiments of the present system also have the aggregation processor in communication with an internet server that allows an operator to create and modify the algorithms (as well as other aspect of the aggregation process 402) from any Internet connected computer running a web browser that has called up the aggregation processor operator website.

Reliability scores stored in the reliability score database 410 may be created and updated by a reliability score processor 414. The reliability score processor 414 determines the reliability score for a user based on user data that may be collected from multiple sources. These may include user data stored in user information databases 416 and 417 connected directly to the processor 414, (e.g., fraud databases, industry databases, merchant databases, etc.). They may also include additional user information databases 418, 419, in communication with the processor 414 through the Internet 408 (e.g., federal, state and local government databases, financial databases, legal databases, etc.).

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A transaction aggregation method comprising:
   receiving, at an aggregation processor, user data and a current transaction amount associated with a current transaction;
   retrieving, by the aggregation processor from a database stored on a computer readable medium, a reliability score for the user with the user data, and calculating, using the aggregation processor, an aggregation threshold based on the reliability score;
   updating, by the aggregation processor, an aggregated transaction amount by adding the current transaction amount to a previously aggregated transaction amount from previous transactions; and
   comparing, by the aggregation processor, the updated aggregated amount with the aggregation threshold, wherein the current transaction is aggregated with the previous transactions when the updated aggregated amount is less than the aggregation threshold.

2. The transaction aggregation method of claim 1, wherein the reliability score is determined by:
   assigning a value to a component of the user data; and
   combining, using the aggregation processor, the value with values of other components of the user data to generate the reliability score.

3. The transaction aggregation method of claim 1, wherein the current transaction is processed as an unaggregated transaction when the updated aggregated amount is greater than the aggregation threshold.

4. The transaction aggregation method of claim 1, wherein the user data comprises an email address, an IP address, a user name, a user address, a user age, a user's financial condition, a user's successful transaction history, or a user's unsuccessful transaction history.

5. The transaction aggregation method of claim 4, wherein the transaction data comprises information about transaction location, transaction venue, transaction item, transaction payment channel, or transaction discounts.

6. The transaction aggregation method of claim 1, wherein the determination of the reliability score is also based on transaction data.

7. The transaction aggregation method of claim 1, wherein the determination of the reliability score comprises:
   generating a raw reliability score from one or more components of the user data; and
   adjusting the raw reliability score with an adjustment factor to produce the reliability score.

8. The transaction aggregation method of claim 7, wherein the adjustment factor is set manually by a merchant involved in the current transaction.

9. The transaction aggregation method of claim 1, wherein the calculation of the aggregation threshold is also based on a loyalty factor.

10. The transaction aggregation method of claim 9, wherein the calculation of the aggregation threshold comprises:
    calculating, by the aggregation processor, an preliminary aggregation threshold based on the reliability score; and
    multiplying, by the aggregation processor, the preliminary aggregation threshold by the loyalty factor to produce the aggregation threshold.

11. A computerized method of selecting a transaction for aggregation with other transactions, the method comprising:
    comparing, by an aggregation processor, a transaction amount associated with the transaction with a threshold amount, wherein the transaction is processed as an unaggregated transaction when the transaction amount exceeds the threshold amount, and wherein the transaction is aggregated with one or more other transactions into an aggregated transaction when the transaction amount is less than the threshold amount; and
    comparing, by the aggregation processor, an aggregated amount for the aggregated transaction with an aggregation threshold, wherein one or more additional transactions may be added to the aggregated transaction when the aggregated amount is less than the aggregation threshold, and wherein the aggregated transaction is processed when the aggregated amount exceeds the aggregation threshold, and wherein the aggregation threshold is calculated based on a reliability score that is retrieved from data about a user who has initiated the transaction.

12. A transaction aggregation system comprising:

an input to enter an identity of a user associated with a current transaction;

a memory to store user data associated with the identity, and current transaction amount for the current transaction, wherein the user data is used to determine a reliability score for the user; and a processor to calculate an aggregation threshold based on the reliability score, and to update an aggregated transaction amount by adding the current transaction amount to a previously aggregated transaction amount from previous transactions, wherein the updated transaction amount is compared with the aggregation threshold, and the current transaction is aggregated with the previous transactions when the updated aggregated amount is less than the aggregation threshold.

13. The transaction aggregation system of claim 12, wherein the current transaction is processed as an unaggregated transaction when the updated aggregated amount is greater than the aggregation threshold.

14. The transaction aggregation system of claim 12, wherein the user data stored in the memory is selected from the group consisting of an email address, an IP address, a user name, a user address, a user age, a user's financial condition, a user's successful transaction history, and a user's unsuccessful transaction history.

15. The transaction aggregation system of claim 12, wherein the memory stores transaction data, and the transaction data is also used to determine the reliability score.

16. The transaction aggregation system of claim 15, wherein the transaction data comprises information about transaction location, transaction venue, transaction item, transaction payment channel, or transaction discounts.

17. A transaction aggregation network comprising:

a first node where an identity of a user conducting a current transaction on the network is input;

a second node where user data associated with the identity of the user is stored, wherein the user data is used to retrieve a reliability score for the user; and a third node where an aggregation threshold based on the reliability score is calculated, and an updated aggregated transaction amount is generated by adding a current transaction amount to a previously aggregated transaction amount from previous transactions, wherein the updated transaction amount is compared with the aggregation threshold, and the current transaction is added to the previous transactions to form an aggregated transaction when the updated aggregated amount is less than the aggregation threshold.

18. The transaction aggregation network of claim 17, wherein the network comprises a fourth node comprising a financial data network where the aggregated transaction is sent to be processed.

19. The transaction aggregation network of claim 18, wherein aggregated transaction data is sent between the third node and the fourth node over the Internet.

20. The transaction aggregation network of claim 19, wherein the aggregated transaction data is encrypted.

* * * * *

UNITED STATES PATENT AND TRADEMARK OFFICE
CERTIFICATE OF CORRECTION

PATENT NO.       : 7,665,658 B2
APPLICATION NO.  : 11/147581
DATED            : February 23, 2010
INVENTOR(S)      : Helen Fields Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,665,658 B2 | Page 1 of 1 |
| APPLICATION NO. | : 11/147581 | |
| DATED | : February 23, 2010 | |
| INVENTOR(S) | : Fields | |

It is certified that error appears in the above-identified patent and that said Letters Patent is hereby corrected as shown below:

On the Title Page, Item (56)
In the References Cited

All references cited under the FOREIGN PATENT DOCUMENTS should be removed from the face of the patent as they were submitted with an Information Disclosure Statement filed on March 17, 2006 for U.S. Patent Application No. 11/147,851 (now U.S. Patent No. 7,164,019) for Lee, et al.

All references cited under the OTHER PUBLICATION Item (56) should be removed from the face of the patent as they were submitted with an Information Disclosure Statement filed on March 17, 2006 for U.S. Patent Application No. 11/147,851 (now U.S. Patent No. 7,164,019) for Lee, et al.

Signed and Sealed this
Fifth Day of July, 2011

David J. Kappos
*Director of the United States Patent and Trademark Office*